US010002431B2

(12) United States Patent
Sridhar et al.

(10) Patent No.: US 10,002,431 B2
(45) Date of Patent: Jun. 19, 2018

(54) LOCATING A FEATURE FOR ROBOTIC GUIDANCE (71) Applicant: THE BOEING COMPANY, Chicago, IL (US)

(72) Inventors: Shubang Sridhar, North Charleston, SC (US); Philip L. Freeman, Summerville, SC (US)

(73) Assignee: THE BOEING COMPANY, Chicago, IL (US)

(*) Notice: Subject to any disclaimer, the term of this patent is extended or adjusted under 35 U.S.C. 154(b) by 232 days.

(21) Appl. No.: 14/930,931

(22) Filed: Nov. 3, 2015

(65) Prior Publication Data
US 2017/0124714 A1 May 4, 2017

(51) Int. Cl.
H04N 13/02 (2006.01)
G06T 17/00 (2006.01)
(Continued)

(52) U.S. Cl.
CPC .......... *G06T 7/0046* (2013.01); *B25J 9/1687* (2013.01); *B25J 9/1697* (2013.01); *G01B 11/2545* (2013.01); *G06K 9/00208* (2013.01); *G06K 9/28* (2013.01); *G06T 7/0057* (2013.01); *G06T 7/0085* (2013.01); *G06T 7/521* (2017.01); *G06T 7/564* (2017.01); *G06T 7/593* (2017.01);
(Continued)

(58) Field of Classification Search
CPC .......... H04N 13/0253; H04N 13/0271; H04N 13/0282; G06T 7/0046; G06T 7/0057; G06T 7/0085; B25J 9/1697; B25J 9/1687
See application file for complete search history.

(56) References Cited

U.S. PATENT DOCUMENTS 9,189,889 B2* 11/2015 Huang ................ G06T 17/00
2010/0303336 A1* 12/2010 Abraham ........... G01B 11/2755
382/154

(Continued)

FOREIGN PATENT DOCUMENTS

CN 104346608 A 2/2015

OTHER PUBLICATIONS

Jurgen Sturm "Vision-based Detection for Learning Articulation Models of Cabinet Doors and Drawers in Household Environments" 2010 IEEE International Conference on Robotics and Automation Anchorage Convention District May 3-8, 2010, Anchorage, Alaska, USA.* White Light Scanner Systems, Hexagon Metrology, 2015, 2 pages, Hexagon, Stockholm, Sweden,<vhttp://www.hexagonmetrology.com/White-Light-Scanner-Systems_237.htm#.VaPGSmPV3nQ>.

(Continued)

*Primary Examiner* — Tsion B Owens
(74) *Attorney, Agent, or Firm* — Patterson + Sheridan, LLP (57) ABSTRACT Aspects herein use a feature detection system to visually identify a feature on a component. The feature detection system includes at least two cameras that capture images of the feature from different angles or perspectives. From these images, the system generates a 3D point cloud of the components in the images. Instead of projecting the boundaries of features onto the point cloud directly, the aspects herein identify predefined geometric shapes in the 3D point cloud. The system then projects pixel locations of the feature's boundaries onto the identified geometric shapes in the point cloud. Doing so yields the 3D coordinates of the feature which then can be used by a robot to perform a manufacturing process.

18 Claims, 8 Drawing Sheets (51) Int. Cl.
| | |
|---|---|
| G06T 7/00 | (2017.01) |
| B25J 9/16 | (2006.01) |
| G01B 11/25 | (2006.01) |
| G06K 9/00 | (2006.01) |
| G06K 9/28 | (2006.01) |
| G06T 7/521 | (2017.01) |
| G06T 7/564 | (2017.01) |
| G06T 7/593 | (2017.01) |

(52) U.S. Cl.
CPC ..... *H04N 13/0253* (2013.01); *H04N 13/0271* (2013.01); *H04N 13/0282* (2013.01); *G05B 2219/40033* (2013.01); *G06T 2207/10028* (2013.01)

(56) References Cited

U.S. PATENT DOCUMENTS

| | | | |
|---|---|---|---|
| 2013/0100256 A1* | 4/2013 | Kirk | ........... G06T 7/0057 348/48 |
| 2014/0125767 A1* | 5/2014 | Bell | ........... H04N 13/0203 348/46 |
| 2015/0317821 A1* | 11/2015 | Ding | ........... G06T 7/00 345/420 |

OTHER PUBLICATIONS

Wang, Ying et al., Edge Extraction by Merging 3D Point Cloud and 2D Image Data, 10th International Conference and Expo on Emerging Technologies for a Smarter World, Oct. 2013, 6 pages, IEEE, Piscataway, United States.

Choi, Changhyun et al., 3D Pose Estimation of Daily Objects Using an RGB-D Camera, International Conference on Intelligent Robots and Systems, Oct. 2012, 8 pages, IEEE, Piscataway, United States.

Extended Search Report for Application No. 1618427.1-1901 dated Mar. 15, 2017.

Strum et al, "Vision-based detection for learning articulation models of cabinet doors and drawers in household enviroments," 2010 IEEE International Conference on Robotics and Automation Anchorage Convention District, May 3-8, 2010, Anchorage, Alaksa.

Hashimoto et al., "Vision System for Object Handling Robot Using a Low-Resolution Range Image and an Intensity Image," Systems and Computers in Japan, vol. 33, No. 7, 2002. pp. 985-993.

Dzitac et al., "A Depth Sensor to Control Pick-and-Place Robots for Fruit Packaging," 2012 12th International Conference on Control, Automation, Robotics & Vision, Dec. 5-7, 2012 6 pages.

Yuso Hirai and Tomoya Tsukahara, "A Stereo Matching Network Finding Curved Surfaces from Random-dot Sterograms," International Journal of Neural Systems, vol. 6 (Supp. 1995), 7 pages.

\* cited by examiner

LOCATING A FEATURE FOR ROBOTIC GUIDANCE

FIELD

The present disclosure relates to feature detection, and more specifically, to identifying predefined geometric shapes in a 3D point cloud before identifying 3D points corresponding to an edge or boundary of the feature.

BACKGROUND

Feature detection can enable a manufacture process to be automated. A robot may include a visual detection system which identifies a feature on a component. For example, by detecting a bolt, the robot can attach a nut onto the bolt in order to fasten two components together. Using a robot to perform the manufacture process may have several advantages. For example, a robot may be able to fit in confined or congested areas where a human could not. Moreover, the robot can work in areas that would otherwise be hazardous for a human. Thus, using a visual detection system to perform feature detection may permit a robot to perform a process that would otherwise be impossible or extremely difficult for a human to perform.

SUMMARY

One aspect herein is a feature detection system that includes a first electromagnetic sensor, a second electromagnetic sensor arranged in a fixed spatial relationship with the first electromagnetic sensor, and detection logic stored in memory. When executed by a processor, the detection logic is operable to generate a 3D point cloud based on a data captured by at least one of first and second electromagnetic sensors and identify at least one predefined geometric shape in the 3D point cloud. The detection logic is further configured to identify boundary pixels based on a data captured by at least one of the first and second electromagnetic sensors where the boundary pixels correspond to an edge of a feature and project locations of the boundary pixels onto the identified geometric shape to identify 3D locations of the feature corresponding to the boundary pixels.

In one aspect, in combination above, identifying the predefined geometric shape in the 3D point cloud includes identifying multiple instances of the predefined geometric shape in the 3D point cloud, matching the instances of the predefined geometric shape to model shapes in a design model of components within at least one viewing region of the first and second electromagnetic sensors, and selecting the identified geometric shape by identifying an instance of the predefined geometric shape that matches a model shape containing the feature.

In one aspect, in combination with any example above, the first and second electromagnetic sensors are respective visible light cameras and the feature detection system further includes a laser configured to emit a random dot pattern where images captured by the visible light cameras include at least a portion of the random dot pattern.

In one aspect, in combination with any example above, the boundary pixels are identified using a first image captured one of the visible light cameras, where the first image is captured when the laser is deactivated.

In one aspect, in combination with any example above, identifying the boundary pixels includes performing edge detection on the first image, where the boundary pixels are located on a 2D image plane.

In one aspect, in combination with any example above, generating the 3D point cloud includes generating a disparity map by comparing locations of objects in a first image captured by the first electromagnetic sensor to locations of the objects in a second image captured by the second electromagnetic sensor, the disparity map indicating distances between the objects and the first and second electromagnetic sensors and generating the 3D point cloud based on the disparity map.

In one aspect, in combination with any example above, the detection logic is configured to fit the 3D locations of the feature to an expected geometric shape of the feature, wherein some of the 3D locations are identified as outliers and are ignored.

Moreover, aspects herein include any alternatives, variations, and modifications of the preceding arrangement or configurations of the feature detection system recited above.

Another aspect described herein is a method that includes generating a 3D point cloud based on a data captured by at least one of a first electromagnetic sensor and a second electromagnetic sensor, wherein the first electromagnetic sensor is arranged in a fixed spatial relationship with the second electromagnetic sensor. The method includes identifying at least one predefined geometric shape in the 3D point cloud and identifying boundary pixels based on a data captured by at least one of the first and second electromagnetic sensors where the boundary pixels correspond to an edge of the feature. The method includes projecting locations of the boundary pixels onto the identified geometric shape to identify 3D locations of the feature corresponding to the boundary pixels.

In one aspect, in combination with the method above, identifying the predefined geometric shape in the 3D point cloud includes identifying multiple instances of the predefined geometric shape in the 3D point cloud, matching the instances of the predefined geometric shape to model shapes in a design model of components within at least one viewing region of the first and second electromagnetic sensors, and selecting the identified geometric shape by identifying an instance of the predefined geometric shape that matches a model shape containing the feature.

In one aspect, in combination with any of the method examples above, the first and second electromagnetic sensors are respective visible light cameras, and the method further includes activating a laser emitting a random dot pattern, where images captured by the visible light cameras include at least a portion of the random dot pattern.

In one aspect, in combination with any of the method examples above, the method includes determining coefficients corresponding to the identified geometric shape using a plane fitting technique, where the coefficients describe a plane in free space and where projecting the locations of the boundary pixels on the identified geometric shape comprises projecting the locations of the boundary pixels on the plane defined by the coefficients.

In one aspect, in combination with any of the method examples above, identifying the boundary pixels includes performing edge detection on the third image, wherein the boundary pixels are located on a 2D image plane.

In one aspect, in combination with any of the method examples above, generating the 3D point cloud includes generating a disparity map by comparing locations of objects in a first image captured by the first electromagnetic sensor to locations of the objects in a second image captured by the second electromagnetic sensor, the disparity map indicating distances between the objects and the first and second electromagnetic sensors and generating the 3D point cloud based on the disparity map.

Moreover, aspects herein include any alternatives, variations, and modifications of the preceding arrangement or configurations of the methods recited above.

Another aspect described herein is a computer-readable storage medium for detecting a feature. The computer-readable storage medium comprising computer-readable program code executable by one or more computer processors to generate a 3D point cloud based on a data captured by at least one of a first electromagnetic sensor and a second electromagnetic sensor where the first electromagnetic sensor is arranged in a fixed spatial relationship with the second electromagnetic sensor. The program code is executable to identify at least one predefined geometric shape in the 3D point cloud and identify boundary pixels based on a data captured by at least one of the first and second electromagnetic sensors, where the boundary pixels correspond to an edge of the feature. The program code is executable to project locations of the boundary pixels onto the identified geometric shape to identify 3D locations of the feature corresponding to the boundary pixels.

BRIEF DESCRIPTION OF THE DRAWINGS

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects herein use a feature detection system to visually identify a feature on a component. While the specific example of a hole or aperture is described herein, other features may include a specific edge, a fastener (e.g., bolt or nut), an indentation, and the like. The feature detection system includes at least two cameras that capture images of the feature from different angles or perspectives. From these images, the system generates a 3D point cloud representing the components captured in the images. However, the 3D point cloud can be noisy which results in the feature being difficult to detect.

Instead of projecting the boundaries of the feature onto the point cloud directly, the aspects herein identify predefined geometric shapes in the 3D point cloud before mapping the boundaries of the feature to points in 3D space. For example, plane fitting may be used to identify the different planar shapes in the 3D point cloud. By identifying the planes in the 3D point cloud, the feature detection system removes much of the noise in the 3D point cloud. Using an edge detection technique, the system detects the boundaries of the feature in a 2D image plane. Put differently, the feature detection system determines the pixels in one of the images captured by the cameras that define the boundary of the feature. The system projects these pixel locations onto one of the planes identified by performing plane fitting. Doing so yields the 3D coordinates of the feature which then can be used by a robot to perform a manufacturing process.

Figure 1:
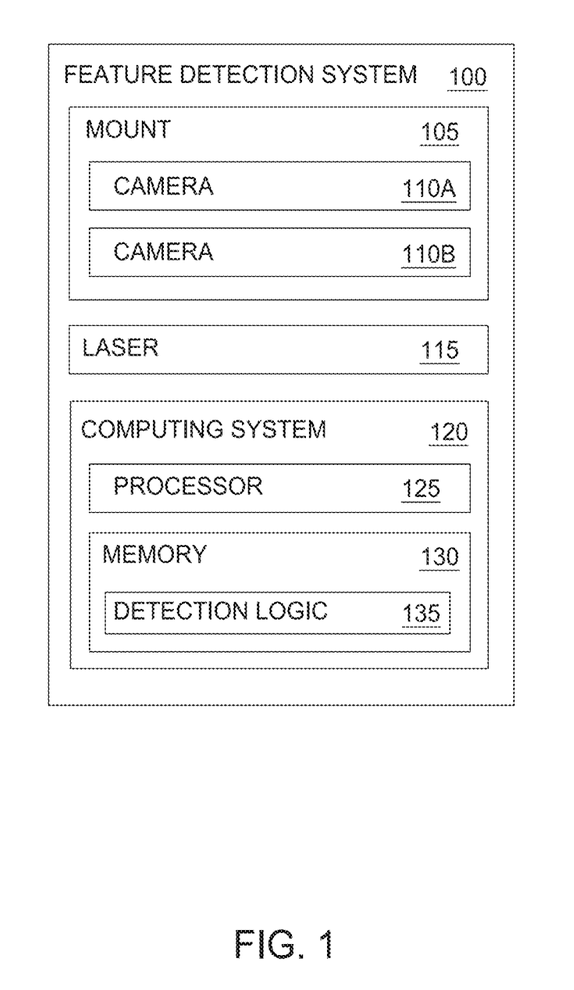
FIG. 1 is a block diagram of a feature detection system.

FIG. 1 is a block diagram of a feature detection system 100 which includes a mount 105, a laser 115, and a computing system 120. The mount 105 includes a left camera 110A and a right camera 110B. The cameras 110 are attached to the mount 105 such that the spatial relationship between the cameras 110 remains fixed even as the feature detection system 100 moves. For example, the feature detection system 100 may be attached to a robot which moves in an environment to perform a manufacture process. As the robot moves, the mount 105 ensures that the spatial relationship of the cameras 110, relative to each other, remains fixed. However, in other aspects, the feature detection system 100 may use only one visible light camera or more than two visible light cameras to perform the functions described herein. For example, the feature detection system 100 may include only one visible light camera which is used in combination with a laser projector, time-of-flight camera, or lidar scanner. Stated differently, the feature detection system 100 includes two electromagnetic sensors (e.g., visible light camera, laser projector, time-of-flight camera, or lidar scanner) which are in a fixed spatial relationship.

In one aspect, the laser 115 is also attached to the mount 105 but this is not a requirement. In another aspect, the laser 115 may have a separate mount that attaches the laser 115 to the rest of the components in the system 100. The laser 115 may be used to project a random dot pattern onto one or more components that are within the viewing areas of the cameras 110. In many manufacturing environments, the surfaces of the components may lack texture. As described below, the random dot pattern may provide texture to these surfaces which can then be used to facilitate matching of regions of one image with regions of another image.

The computing system 120 includes a processor 125 and memory 130. The processor 125 represents any number of processing elements that each may include multiple processing cores. The memory 130 can be volatile or non-volatile memory that is located on the feature detection system 100 or disposed elsewhere. For example, memory 130 may include main memory disposed on the system 100 as well as storage space in a cloud environment or remote server.

Memory 130 includes detection logic 135 that represents a software application or a suite of software applications for processing images captured by the cameras 110 in order to detect a feature in the images (also referred to as a "desired feature" or a "feature to be found"). Although the aspects herein describe identifying a hole or aperture in a component, the techniques described herein may also be used to identify other features such as a fastener, an edge, or an indentation in a component. Moreover, the feature detection system 100 may include hardware components for performing some or all of the functions attributed to the detection logic 135.

Figure 2:
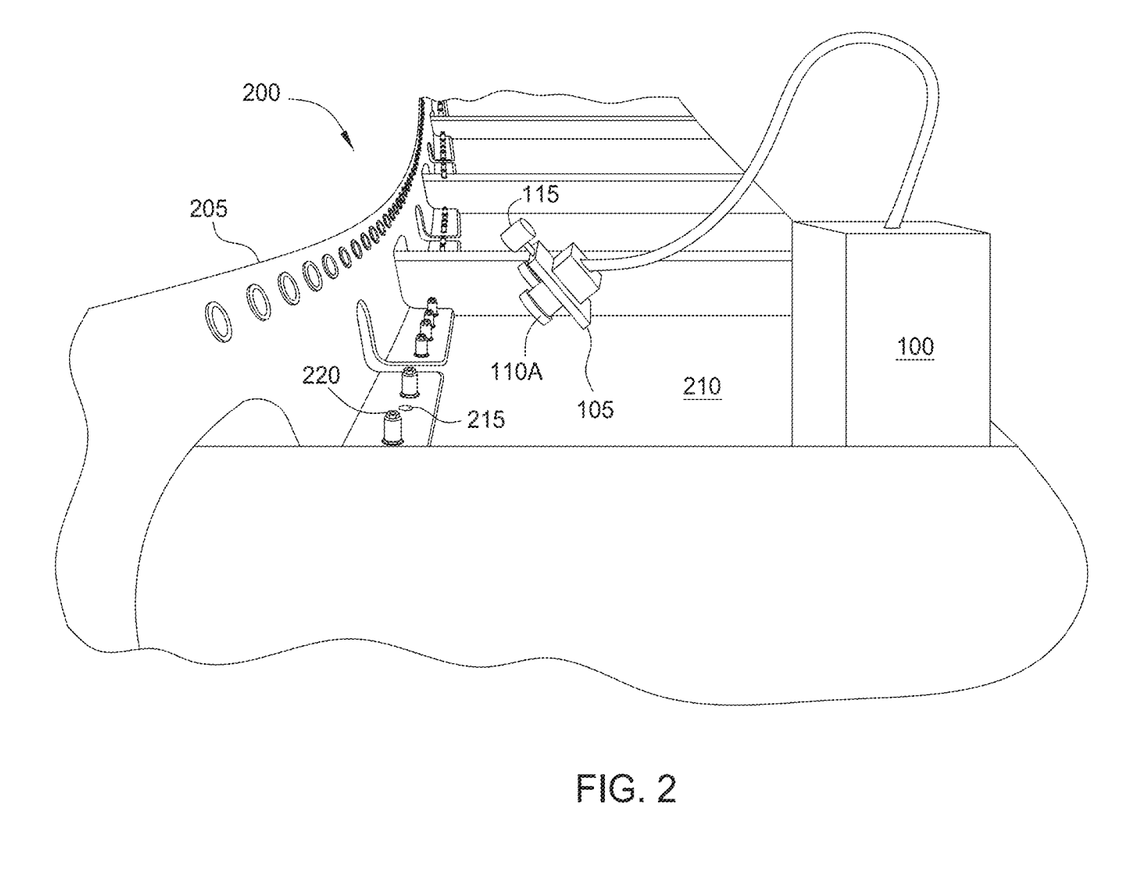
FIG. 2 illustrates using the feature detection system to identify a feature on a component.

FIG. 2 illustrates using the feature detection system 100 to identify a feature 215 on a component. In one aspect, FIG. 2 illustrates a manufacturing environment 200 where the feature detection system 100 is used to identify the feature 215. The system 100 may be mounted on a robot that includes a propulsion system for moving in the environment 200.

The environment 200 includes a bracket 205 that is being attached to a skin 210 using fasteners. In one aspect, the skin 210 provides support to an aircraft body. To do so, the fasteners may include a bolt that extends through the skin 210 and the bracket 205. A nut 220 is attached to the bolt in order to couple the different components together. In the examples herein, the feature 215 to be identified by the system 100 is a hole or aperture in the bracket 205. Although not shown, the hole may extend through skin 210 such that a bolt can be pushed through the other side of the skin 210 so that a threaded portion of the bolt is exposed. By identifying the location of the feature 215 in free space, a robot (not shown) can attach a nut 220 once the bolt is inserted through the aperture. Although the feature detection system 100 identifies the location of the hole, in another example, the feature detection system 100 may detect the bolt after the bolt has been pushed through the aperture. In still another example, the feature detection system 100 may identify the nuts 220 as the feature so that a robot can remove the nuts 220 in order to disassemble the components.

The cameras 110 are attached to the mount 105 although only camera 110A is shown in FIG. 2 since this is a side view of the system 100. In this example, the laser 115 is attached to the mount 105. However, in other aspects, the laser 115 may be attached to the feature detection system 100 using a different mount. Generally, the feature detection system 100 aligns the laser 115 such that the region struck by the random dot pattern emitted by the laser 115 is within the view of the cameras 110. That is, when the laser 115 is activated, the cameras 110 capture an image that includes the dot pattern emitted by the laser 115. Notably, the camera 110A does not need to be directly above the feature 215 in order to identify the location of the feature 215 in 3D space. As shown here, camera 110A is arranged at an angle relative to the feature 215 such that the aperture appears as an ellipse in the images captured by the camera 110A.

Figure 3:
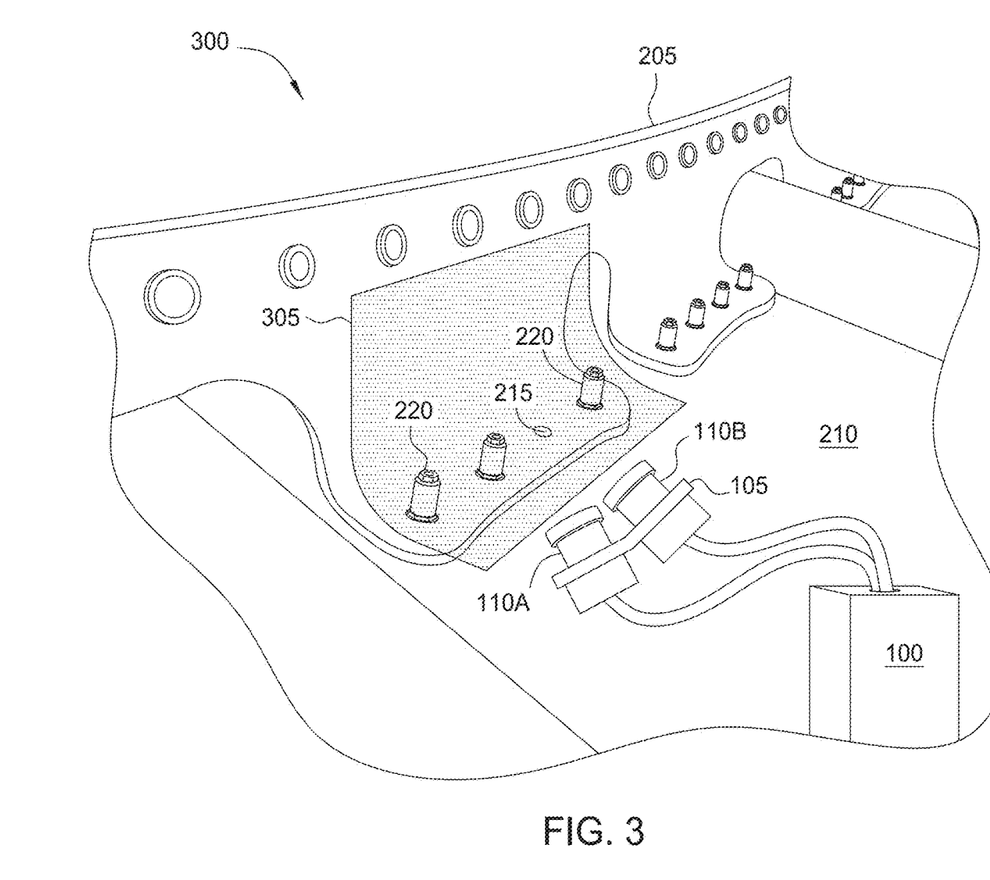
FIG. 3 illustrates illuminating a feature with random dot pattern.

FIG. 3 illustrates illuminating the feature 215 with a random dot pattern 305 using the laser (not shown). In this example, the dot pattern 305 covers the feature 215 and two of the nuts 220. The dot pattern 305 provides texture for the components and surfaces within the pattern 305. For example, the components in the bracket 205 and skin 210 may be smooth and lack texture. Illuminating these surfaces with the dot pattern 305 simulate texture which can be detected by the cameras 110.

The top view of the mount 105 in FIG. 3 illustrates that the mount 105 includes a slight bend between the cameras 110. Although not necessary, bending the mount 105 increases the overlap of the viewing areas of the cameras 110. In environments 300 where the feature is close to the cameras 110, bending the mount 105 may help ensure that the viewing areas overlap. In this example, the images captured by both cameras 110 include the nuts 220 and the feature 215. As explained below, capturing these common features allows the feature detection system 100 to identify the location of the feature 215 in free space (i.e., 3D space).

Figure 4:
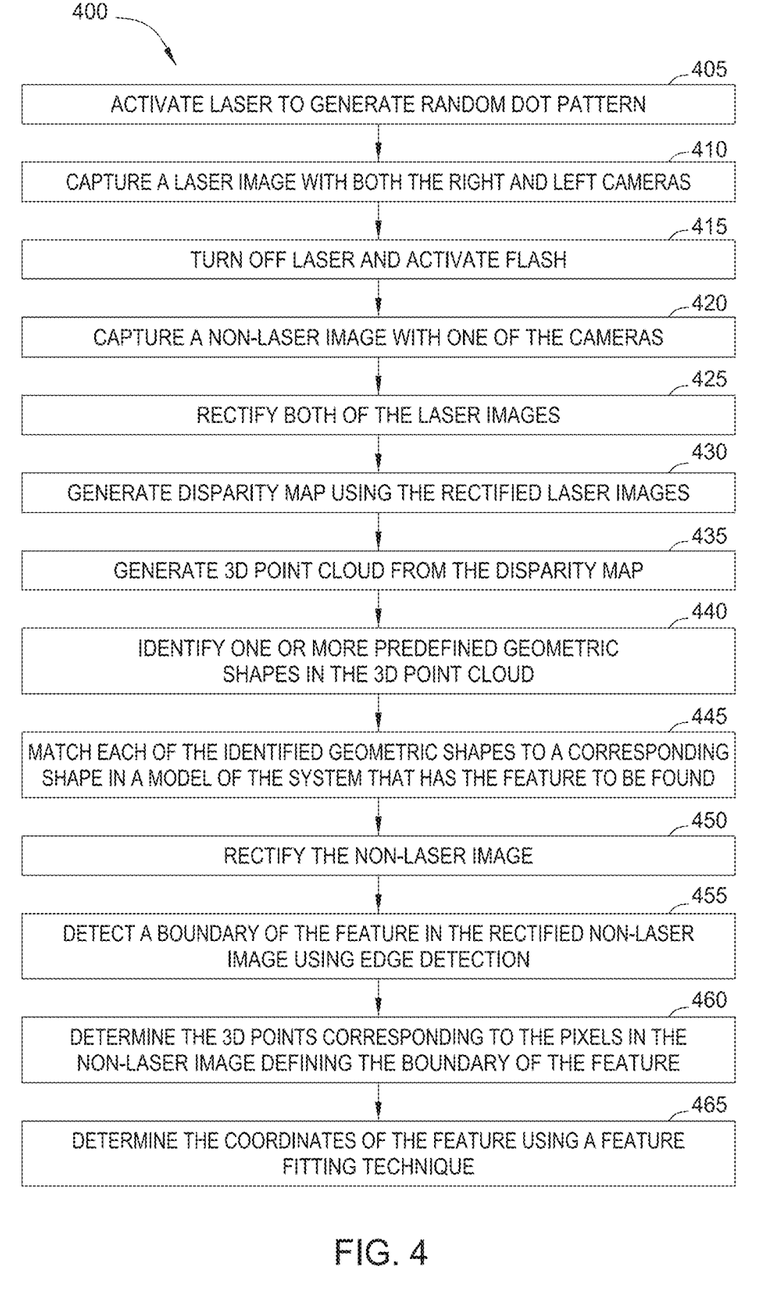
FIG. 4 is a flow chart for visually detecting a feature on a component.

FIG. 4 is a flow chart of a method 400 for visually detecting a feature on a component. For clarity, many of the blocks in method 400 are discussed in tandem with FIGS. 5-9. At block 405, the feature detection system activates the laser to generate a random dot pattern that covers a feature to be found. For example, the feature detection system may be attached to a robot which moves the system to a general location of where the feature should be. Because of manufacturing tolerances, however, the robot may not know the precise location of the feature. In the examples shown in FIGS. 2 and 3, the robot may know generally (within a few inches) where the feature 215—i.e., the hole—is on the bracket 205. This general estimate of the location of the feature may be insufficient to perform a mechanical process such as attaching a nut to a bolt protruding through the hole. Instead, the robot uses the feature detection system to identify the precise 3D location of the feature.

At block 410, the left and right cameras capture images while the laser illuminates the at least a portion of the viewing areas of the cameras. In one aspect, the cameras use a filter that permits only the light emitted by the laser (e.g., light with red a wavelength) to pass through while preventing other colored light (e.g., blue and green) from being captured in the images. As shown in FIG. 3, each camera 110 captures an image of the components within the dot pattern 305. Because of the different locations and angles of the cameras 110, the locations of the feature 215, the nuts 220, and surfaces of the bracket 205 and skin 210 are different in the two images. In one aspect, the two images both capture at least the feature 215. However, in other aspects, the cameras may capture other attributes or characteristics in both images such as the nuts 220 which may improve the accuracy of the steps discussed below.

At block 415, the feature detection system turns off the laser and activates a flash. At block 420, one of the cameras in the feature detection system captures a non-laser image (i.e., an image taken when the laser is off) when the components are illuminated using the flash. If there is sufficient light in the viewing area of the cameras, then the flash may not be necessary. In one aspect, the non-laser image is captured when the cameras are in the same position when the two laser images were captured at block 410. For example, if the left camera is used to capture the non-laser image, then this image includes the same objects and components as the laser image captured by the left camera at block 410 except the objects are not illuminated by the laser.

At block 425, the feature detection system rectifies both of the laser images. The parameters used to rectify the laser images may be generated when the cameras are calibrated. In one aspect, rectifying the images removes bulging near the perimeter of the images which may be an effect introduced by the cameras. Once rectified, straight lines that would otherwise appear curved at the perimeter of the images appear straight in the rectified images to better represent the actual shape of the components. Further, in the rectified images the images are aligned in the vertical direction such that horizontal lines through both images pass through the same features to facilitate feature matching when generating a disparity map as discussed below.

At block 430, the detection logic generates a disparity map using the rectified laser images. Generally, the disparity map is a composite of the images that illustrates distance between different locations in the disparity map and the cameras. The aspects herein are not limited to any particular technique or algorithm for generating the disparity map. In one example, the detection logic generates the disparity map by determining the change in location of the same object in the two images. For example, the location of a nut in the image captured by the right camera may be ten pixels away from the location of the same nut in the image captured by the left camera. Generally, the greater the change in location of the object in the two images, the closer the object is to the cameras. Conversely, the smaller the change in location of the object, the further away the object is from the cameras. Adding texture to the surfaces by emitting the dot pattern may aid the detection logic to identify the shifting locations of the objects, and thus, generate the disparity map.

Figure 5:
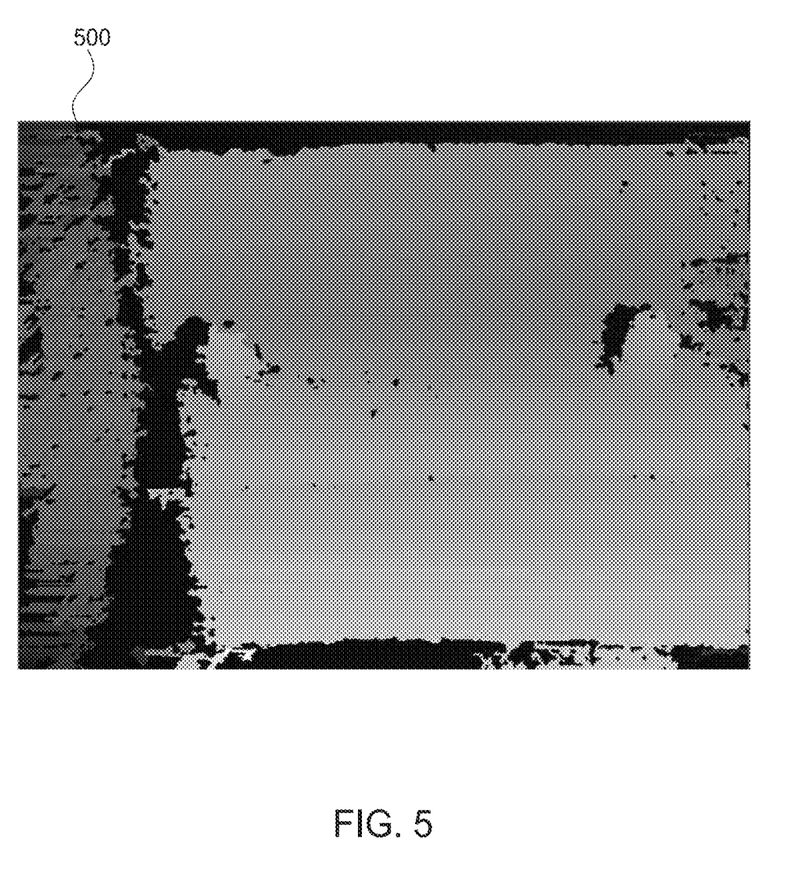
FIG. 5 illustrates a disparity map generated from images captures by stereoscopic cameras.

FIG. 5 illustrates a disparity map 500 generated from images captured by the rectified laser images. Specifically, disparity map 500 uses a greyscale to indicate a distance at each point (or pixel) in the map 500 to the cameras of the feature detection system. The lighter colored locations indicate regions that are closer to the cameras while the darker regions are further away from the camera. Some portions of the map 500 may be black indicating that the distance between the object in that location of the map and the camera cannot be determined. For example, the dot pattern emitted by the laser may not have struck these portions of the image (e.g., the portions may have been within a shadow), and as such, there was no texture to enable the detection logic to compare the two laser images.

Returning to method 400, at block 435, the detection logic generates a 3D point cloud from the disparity map. Stated differently, the detection logic converts the 2D disparity map into a 3D point cloud that represents the components captured by the laser images. To do so, the detection logic may convert each pixel in the disparity map into a 3D point. The various techniques and algorithms that may be used to perform this conversion will not be described in detail here. Moreover, instead of using images captured by two visible light cameras, in one aspect, the 3D point cloud is derived from data captured by a different type of electromagnetic sensor such as a laser projector, time-of-flight camera, or a lidar scanner.

Figure 6A:
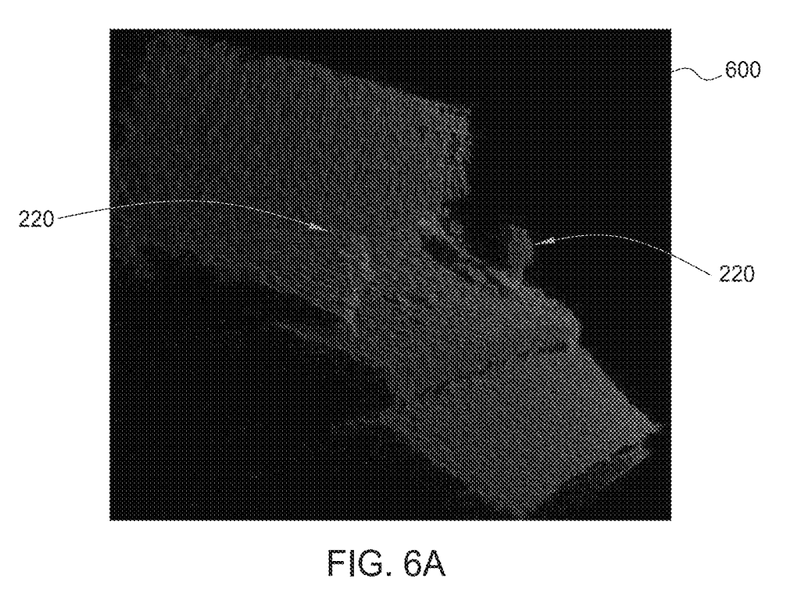
FIGS. 6A and 6B illustrate 3D point clouds derived from the disparity map.
Figure 6B:
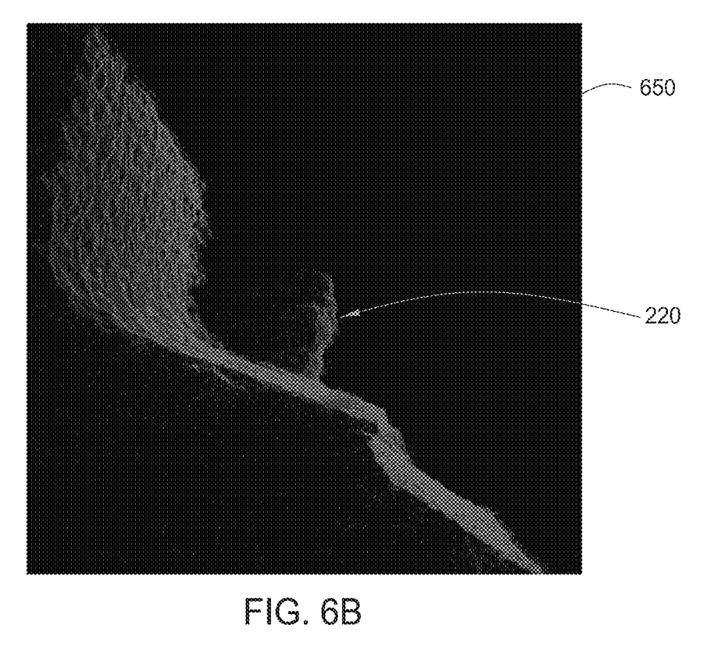

FIGS. 6A and 6B illustrate 3D point clouds derived from the disparity map. Specifically, FIG. 6A illustrates a plan view 600 of the 3D point cloud derived from the disparity map 500 in FIG. 5 while FIG. 6B illustrates a side view 650 of the same 3D point cloud. As shown, the 3D point cloud represents the shape and depth of the components captured by the cameras using a plurality of individual points in 3D space. As a reference, the two nuts 220 to the left and right of the hole can be seen in the 3D point cloud.

Returning to method 400, at block 440, the detection logic identifies one or more predefined geometric shapes in the 3D point cloud. In one aspect, the detection logic performs plane fitting to identify different planes in the 3D point cloud. That is, the detection logic evaluates the different points in the cloud to identify a group of points that make up a plane. Once a plane is found, the detection logic determines plane coefficients that define the plane in 3D space. Moreover, in one aspect, the detection logic also determines the direction normal to the plane. For example, the detection logic may use the coefficients to determine the normal direction of the plane.

Figure 7:
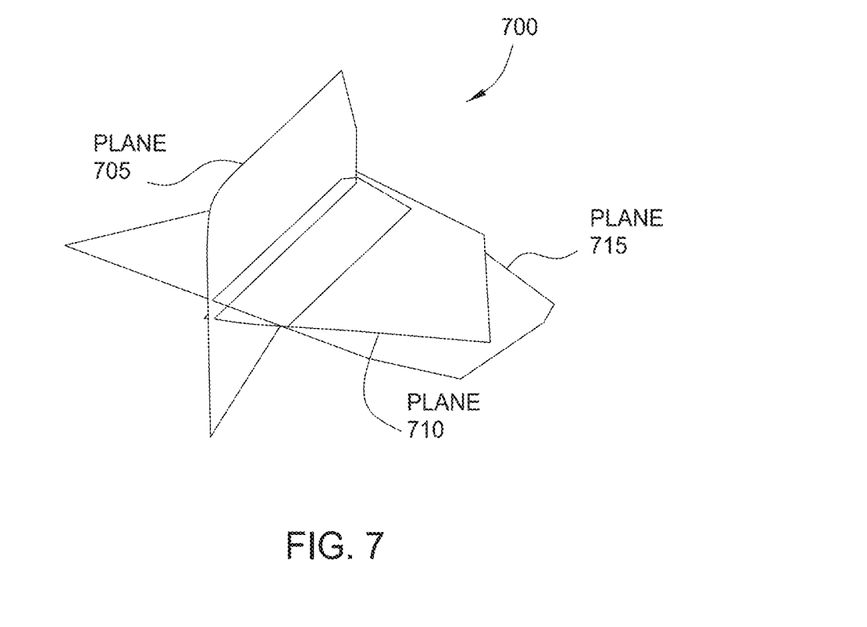
FIG. 7 illustrates identifying predefined geometric shapes in the 3D point cloud.

FIG. 7 illustrates the identified planes in the 3D point cloud. As shown, performing plane fitting results in identifying three separate planes: plane 705, 710, and 715. Planes 705 and 710 correspond to the two surfaces of the bracket 205 in FIG. 2 which form a right angle. Plane 715, on the other hand, corresponds to the portion of the skin 210 in FIG. 2 which extends below the bracket 205. Because the points in the 3D point cloud corresponding to the nuts 220 do not form planes, these points may be ignored.

The detection logic fits the planes 705, 710 and 715 to the points in the 3D point cloud. As such the model 700 may more accurately represent the shape and configuration of the actual components. As will be described below, once the coefficients of the plane are identified, the detection logic uses these coefficients to define a plane which can be used to identify the 3D points of the feature.

Although plane fitting is specifically discussed, method 400 is not limited to such. For example, different predefined geometric shapes may instead be used to identify surfaces in the 3D point cloud. For example, the detection logic may use a cylinder or a hemi-sphere as the predefined shape. Regardless, once a shape is found in the 3D point cloud, the detection logic generates parameters for each of the identified shapes that define the location and orientation of the shapes in free space.

Returning to method 400, at block 445, the detection logic matches the identified geometric shapes to corresponding shapes in a predefined design model of the system that has the feature to be found. Put differently, now that the detection logic has identified the shapes in the 3D point cloud (i.e., the planes in the point cloud as shown in FIG. 7), the logic matches these planes to the planes in a predefined model of the components.

Figure 8:
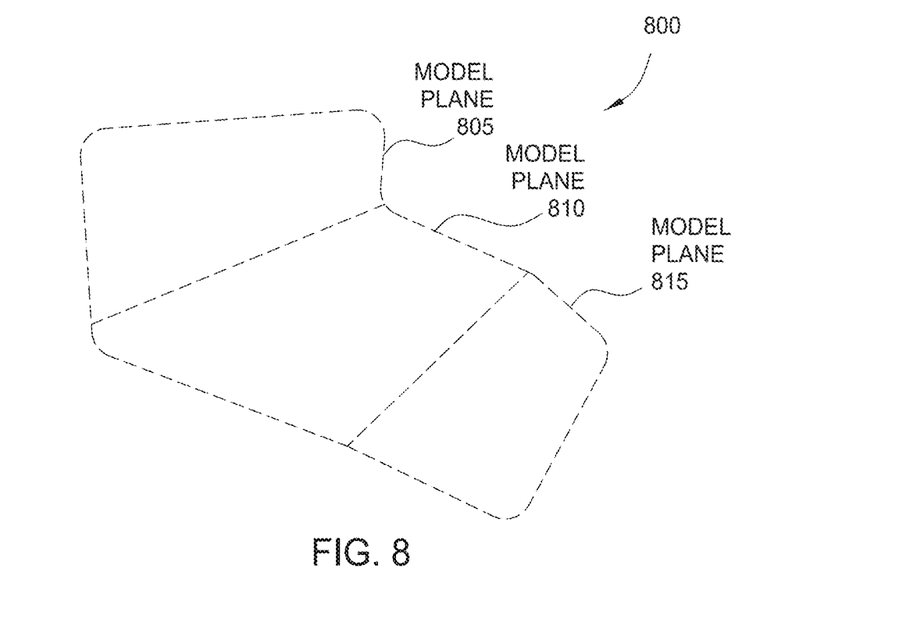
FIG. 8 illustrates a design model of the components that includes the feature.

FIG. 8 illustrates a predefined model 800 of the components that are captured by the images. As shown, the model 800 includes model planes 805, 810, and 815. These planes may be part of a design model that is used when designing a part or product—e.g., the fuselage of an airplane. For example, the model 800 may be a computer assisted drawing (CAD) of the airplane that defines the desired dimensions of the planes 805, 810, and 815. The model 800 may also define the spatial relationship between the different components in the product—e.g., the relationship between the bracket and skin of the airplane.

Because of the different variable locations and orientations of the cameras when capturing the images used to generate the model 700 shown in FIG. 7, the orientation, shape, and size of the planes 805, 810, and 815 may be different than the planes 705, 710, and 715. Nonetheless, the detection logic can use the similarities between the planes to match the planes of model 700 to the planes in model 800. Put differently, the detection logic can determine that planes 705 and 805 both correspond to the vertical surface of the bracket 205, planes 710 and 810 both correspond to the horizontal surface of the bracket 205, and planes 715 and 815 both correspond to the surface of the skin 210 extending under the bracket 205.

By matching the planes identified at block 440 to the planes in the predefined model of the components, the detection logic can identify the plane that includes the feature to be found. Stated differently, the detection logic can determine which of the planes 705, 710, and 715 in the model 700 includes the hole. For example, a programmer may have already informed the detection logic that model plane 810 includes the desired feature. Thus, after matching model plane 810 to plane 710 in model 700, the detection logic now knows that plane 710 is the plane that includes the feature the detection logic is searching for.

Returning to method 400, at block 450, the detection logic rectifies the non-laser image. In one aspect, the detection logic uses the same parameters used at block 425 to rectify the image captured when the laser is turned off.

At block 455, the detection logic detects a boundary of the feature in the rectified non-laser image using edge detection. While 3D point clouds are good at identifying distances between the objects captured in the images and the cameras, the point clouds may not be very good at identifying the particular boundaries or edges of the feature—i.e., the circumference of the hole. As such, method 400 uses the non-laser image and an edge detection algorithm to identify the boundaries of the feature.

Generally, the edge detection method identifies pixels within the non-laser image that correspond to the boundary of the feature. In this example, the detection logic identifies some or all of the pixels that define the circumference of the hole in the bracket 205. In one aspect, the detection logic identifies the pixels according their coordinate location (referred to herein as the u, v coordinates) in a 2D image plane. This list of pixels and their coordinates in the image can then be stored in the feature detection system. The aspects described herein are not limited to any particular type of edge detection method. Instead, any method that identifies the pixels corresponding to one or more edges of the feature can be used.

At block 460, the detection logic determines the 3D points corresponding to the pixel locations in the non-laser image defining the boundary of the feature. That is, after performing block 455, the detection logic knows the locations of the pixels that define the boundaries of the feature, however, the logic does not know the locations of the feature's boundaries in 3D space. Put differently, the detection logic knows where the boundary of the feature is on the 2D image plane but not in free space.

In one aspect, the detection logic projects the locations of the boundaries in the image plane into 3D space. However, projecting these locations on the 3D point cloud, which can be noisy, can lead to unpredictable results. Instead, the detection logic may project the pixel locations of the boundaries onto one of the planes identified at block 440.

Equation 1 represents an equation used to project a 3D location in space to a pixel location on the image plane.

$$s \begin{bmatrix} u \\ v \\ 1 \end{bmatrix} = P \begin{bmatrix} X \\ Y \\ Z \\ 1 \end{bmatrix} \text{ where } P = \begin{bmatrix} f_x & 0 & c_x \\ 0 & f_y & c_y \\ 0 & 0 & 0 \end{bmatrix} \begin{bmatrix} r_{11} & r_{12} & r_{13} & r_{14} \\ r_{21} & r_{22} & r_{23} & r_{24} \\ r_{31} & r_{32} & r_{33} & r_{34} \end{bmatrix} \quad (1)$$

In Equation 1, $f_x$ and $f_y$ are the focal lengths of the lens in the x and y directions, $c_x$ and $c_y$ are the optical axes of the lens in the x and y directions, and the values $r_{xx}$ define a transformation matrix between the normalized camera coordinates and the defined external coordinates of the camera. These values may be provided by the manufacture of the camera or determined during calibration of the camera. The values u and v are the location of the pixel in the image plane while X, Y, and Z define the corresponding location of the pixel in 3D space. Generally, Equation 1 is referred to as the projection equation.

Moreover, Equation 2 is an equation defining a plane in 3D space.

$$[0] = [a \quad b \quad c \quad d] \begin{bmatrix} X \\ Y \\ Z \\ 1 \end{bmatrix} \quad (2)$$

The values a, b, c, and d are the coefficients of the plane while X, Y, and Z represent any point on the plane. As explained above, the coefficients of the planes in the 3D point cloud were determined at block 440. There, plane fitting was used to identify various predefined geometric shapes (e.g., planes) in the 3D point cloud. The detection logic then derived plane coefficients for each of these planes which can then be used in Equation 2. Specifically, the detection logic uses the coefficients of the plane that includes the feature to be found, which was the plane identified at block 445 of method 400. As shown in FIGS. 7 and 8, the plane that includes the feature (e.g., the hole) is plane 710. As such, the detection logic uses the plane coefficients of plane 710 as the values a, b, c, and d in Equation 2.

As can be seen by comparing Equation 1 to Equation 2, both equations share the same vector defined by [X, Y, Z, 1]. As such, these equations can be combined to yield Equation 3.

$$\begin{bmatrix} u \\ v \\ 1 \\ 0 \end{bmatrix} = \begin{bmatrix} P \\ a \quad b \quad c \quad d \end{bmatrix} \begin{bmatrix} X/s \\ Y/s \\ Z/s \\ 1/s \end{bmatrix} \quad (3)$$

Equation 3 represents a system of four equations with four variables (X, Y, Z, and s). Using a solver, the detection logic can identify the 3D point on the plane (which is defined by the variables X, Y, and Z) that corresponds to a pixel in the image plane. In one aspect, because the plane coefficients a, b, c, and d correspond to the plane that includes the feature to be found (i.e., plane 710 in FIG. 7), Equation 3 can be used to project pixel locations to 3D points on plane 710. The detection logic uses Equation 3 to identify 3D points on the plane 710 that correspond to the pixel locations that define the boundary of the feature which were detected at block 455 of method 400. To identify the 3D coordinates, the detection logic uses a particular pixel location on the boundary of the feature as the values u and v in Equation 3 and then solves the four equations to identify values for X, Y, Z, and s (i.e., a scalar value). By repeating this process for each pixel location on the boundary identified at block 445, the detection logic identifies the 3D coordinates of the boundary of the feature on plane 710.

Figure 9:
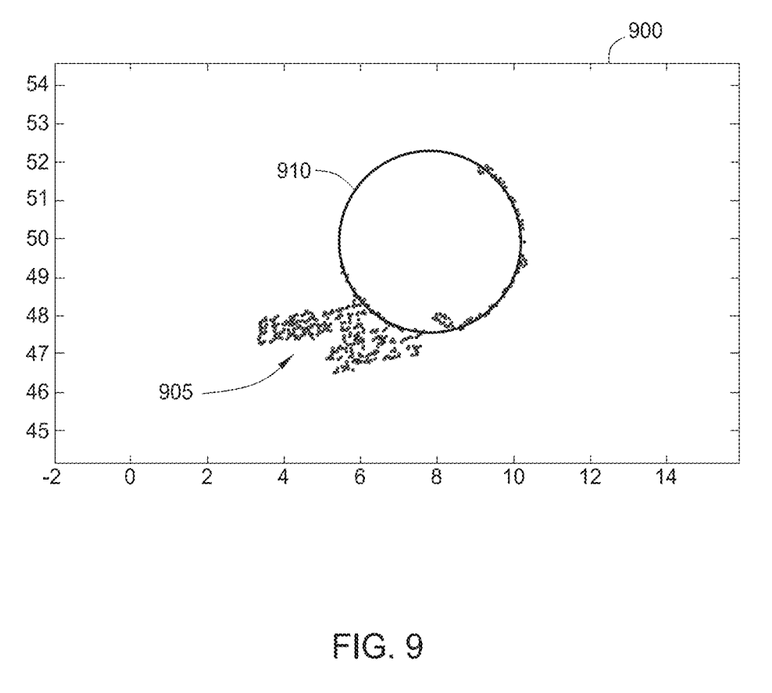
FIG. 9 illustrate identifying the 3D coordinates of the feature.

FIG. 9 illustrate the 3D coordinates corresponding to the pixel locations of the boundary. Specifically, in chart 900, the series of points 905 are 3D coordinates on the plane 710 shown in FIG. 7. Each of the points 905 corresponds to one of the pixel locations identified when doing edge detection at block 455. As can be seen, it is not necessary that edge detection identifies all of the pixel locations along the circumference of the hole, nor only pixels locations that are on the boundary of the hole. For example, the detection logic may detect the entire boundary of the feature because of the angles at which the non-laser image is captured, the brightness of the flash used by the feature detection system, or if portions of the feature were occluded. Further, the detection system may detect points which are not on the boundary because of debris, scratches, or other pixel regions that appear like edges in the image.

Returning to method 400, at block 465, the detection logic determines the coordinates of the feature using a feature fitting technique. In FIG. 9, the detection logic performs a circle fitting technique to identify the 3D coordinates that correspond to the desired feature. For example, a programmer knows that the feature—i.e., the hole—has a boundary that is circular (i.e., an expected geometric shape). As such, the programmer instructs the detection logic to use a circle fitting technique to identify the 3D coordinates of the boundary of the hole. The circle fitting technique evaluates the points 905 corresponding to the 3D points and identifies the points corresponding to the expected shape—a circle in this example.

Here, the circle fitting technique identifies the circle 910 by evaluating the 3D points 905. When doing so, the circle fitting technique may identify and ignore outliers or erroneous 3D points 905 detected during the edge detection process. As shown in chart 900, some of the points 905 (especially the ones in the lower left of the chart) do not fit within the circle 910. These dots may be a result of shadows or a poor angle used when taking the non-laser image. Nonetheless, even with these outliers, FIG. 9 illustrates that the detection logic can identify the expected geometric shape of the feature's circumference—i.e., a circle.

Once the circle 910 is identified, the detection logic assigns the 3D locations along the circle 910 as the boundaries of the feature. That is, the detection logic determines one or more of the 3D points along the circle 910 as the location of the feature—i.e., the circumference of the hole—in free space. These 3D points can then be used by a robot to accurately determine a location of a bolt which is placed through the hole. For example, using the direction normal to the plane (which was identified at block 440) and the 3D locations along the circle 910, the detection logic can accurately predict a location of the tip of a bolt that is inserted through the feature in free space. Using this location, the robot can place a fastener (e.g., a nut) on the tip of the bolt in order to attach two or more components together in a manufacturing process.

Although a circle fitting technique is described above, the detection logic may use a different technique depending on the shape of the particular feature. For example, if the feature is a bolt, the detection logic may use a cylinder at block 465 to identify the 3D boundaries of the bolt. If the feature is a nut, the detection logic may use a hexagon or a square as the expected shape in order to identify the boundary or boundaries of the nut.

In sum, the aspects described herein can be used to identify a feature in free space using two images captured by stereoscopic cameras (e.g., the laser images). To do so, the detection logic identifies predefined geometric shapes in a 3D point cloud generated from the two images. For example, plane fitting may be used to identify the different planes in the 3D point cloud. By identifying the planes in the 3D point cloud, the feature detection system can avoid directly using the 3D point cloud to identify the location of the feature in 3D space. The system uses edge detection to detect the boundary of the feature in an image (e.g., the non-laser image) captured by one of the cameras. That is, the feature detection system determines the pixels in the image that define the boundary of the feature. The system then projects these pixel locations onto one of the planes identified by performing plane fitting. Doing so yields the 3D coordinates of the feature which then can be used by a robot to perform a manufacturing process.

The descriptions of the various aspects have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical logic or technical improvement over technologies found in the marketplace, or to enable others of ordinary skill in the art to understand the aspects disclosed herein.

In the preceding paragraphs, reference is made to aspects presented in this disclosure. However, the scope of the present disclosure is not limited to specific described aspects. Instead, any combination of the preceding features and elements, whether related to different aspects or not, is contemplated to implement and practice contemplated aspects. Furthermore, although aspects disclosed herein may achieve advantages over other possible solutions or over the prior art, whether or not a particular advantage is achieved by a given aspect is not limiting of the scope of the present disclosure. Thus, the preceding aspects, features, and advantages are merely illustrative and are not considered elements or limitations of the appended claims except where explicitly recited in a claim(s).

Aspects may take the form of an entirely hardware aspect, an entirely software aspect (including firmware, resident software, micro-code, etc.) or an aspect combining software and hardware aspects that may all generally be referred to herein as a "circuit," "module" or "system."

Aspects may be a system, a method, and/or a computer program product. The computer program product may include a computer readable storage medium (or media) having computer readable program instructions thereon for causing a processor comprising hardware and software to carry out aspects described herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices comprising hardware and software from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present aspects may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects disclosed herein. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to aspects, other and further aspects may be devised without departing from the basic scope thereof, and the scope thereof is determined by the claims that follow.

What is claimed is:

1. A feature detection system comprising:
   a first electromagnetic sensor;
   a second electromagnetic sensor arranged in a fixed spatial relationship with the first electromagnetic sensor;
   a processor;
   a memory storing detection logic, which when executed by the processor is operable to:
     generate a 3D point cloud based on a data captured by at least one of first and second electromagnetic sensors;
     evaluate different points in the 3D point cloud to identify a group of points forming at least one predefined geometric shape in the 3D point cloud;
     identify boundary pixels based on a data captured by at least one of the first and second electromagnetic sensors, wherein the boundary pixels correspond to an edge of a feature;
     determine coefficients corresponding to the identified geometric shape using a plane fitting technique, wherein the coefficients describe a plane in free space; and
     project locations of the boundary pixels onto the identified geometric shape to identify 3D locations of the feature corresponding to the boundary pixels, wherein projecting the locations of the boundary pixels on the identified geometric shape comprises projecting the locations of the boundary pixels on the plane defined by the coefficients.

2. The feature detection system of claim 1, wherein evaluating different points in the 3D point cloud comprises:
   identifying multiple instances of the predefined geometric shape in the 3D point cloud;
   matching the instances of the predefined geometric shape to model shapes in a design model of components within at least one viewing region of the first and second electromagnetic sensors; and
   selecting the identified geometric shape by identifying an instance of the predefined geometric shape that matches a model shape containing the feature.

3. The feature detection system of claim 1, wherein the first and second electromagnetic sensors are respective visible light cameras, the feature detection system further comprising:
   a laser configured to emit a random dot pattern, wherein images captured by the visible light cameras include at least a portion of the random dot pattern.

4. The feature detection system of claim 3, wherein the boundary pixels are identified using a first image captured by one of the visible light cameras, wherein the first image is captured when the laser is deactivated.

5. The feature detection system of claim 4, wherein identifying the boundary pixels comprises:
   performing edge detection on the first image, wherein the boundary pixels are located on a 2D image plane.

6. The feature detection system of claim 1, wherein generating the 3D point cloud comprises:
  generating a disparity map by comparing locations of objects in a first image captured by the first electromagnetic sensor to locations of the objects in a second image captured by the second electromagnetic sensor, the disparity map indicating distances between the objects and the first and second electromagnetic sensors; and
  generating the 3D point cloud based on the disparity map.

7. The feature detection system of claim 1, wherein the detection logic is configured to:
  fit the 3D locations of the feature to an expected geometric shape of the feature, wherein some of the 3D locations are identified as outliers and are ignored.

8. A method, comprising:
  generating a 3D point cloud based on a data captured by at least one of a first electromagnetic sensor and a second electromagnetic sensor, wherein the first electromagnetic sensor is arranged in a fixed spatial relationship with the second electromagnetic sensor;
  evaluating different points in the 3D point cloud to identify a group of points forming at least one predefined geometric shape in the 3D point cloud;
  identifying boundary pixels based on a data captured by at least one of the first and second electromagnetic sensors, wherein the boundary pixels correspond to an edge of a feature;
  determining coefficients corresponding to the identified geometric shape using a plane fitting technique, wherein the coefficients describe a plane in free space; and
  projecting locations of the boundary pixels onto the identified geometric shape to identify 3D locations of the feature corresponding to the boundary pixels, wherein projecting the locations of the boundary pixels on the identified geometric shape comprises projecting the locations of the boundary pixels on the plane defined by the coefficients.

9. The method of claim 8, wherein evaluating different points in the 3D point cloud comprises:
  identifying multiple instances of the predefined geometric shape in the 3D point cloud;
  matching the instances of the predefined geometric shape to model shapes in a design model of components within at least one viewing region of the first and second electromagnetic sensors; and
  selecting the identified geometric shape by identifying an instance of the predefined geometric shape that matches a model shape containing the feature.

10. The method of claim 8, wherein the first and second electromagnetic sensors are respective visible light cameras, the method further comprising:
  activating a laser emitting a random dot pattern, wherein images captured by the visible light cameras include at least a portion of the random dot pattern.

11. The method of claim 8, wherein identifying the boundary pixels comprises:
  performing edge detection on an image, wherein the boundary pixels are located on a 2D image plane.

12. The method of claim 8, wherein generating the 3D point cloud comprises:
  generating a disparity map by comparing locations of objects in a first image captured by the first electromagnetic sensor to locations of the objects in a second image captured by the second electromagnetic sensor, the disparity map indicating distances between the objects and the first and second electromagnetic sensors; and
  generating the 3D point cloud based on the disparity map.

13. A non-transitory computer-readable storage medium for detecting a feature, the computer-readable storage medium comprising computer-readable program code executable by one or more computer processors to:
  generate a 3D point cloud based on a data captured by at least one of a first electromagnetic sensor and a second electromagnetic sensor, wherein the first electromagnetic sensor is arranged in a fixed spatial relationship with the second electromagnetic sensor;
  identify at least one predefined geometric shape in the 3D point cloud;
  identify boundary pixels based on a data captured by at least one of the first and second electromagnetic sensors, wherein the boundary pixels correspond to an edge of the feature;
  determining coefficients corresponding to the identified geometric shape using a plane fitting technique, wherein the coefficients describe a plane in free space; and
  project locations of the boundary pixels onto the identified geometric shape to identify 3D locations of the feature corresponding to the boundary pixels, wherein projecting the locations of the boundary pixels on the identified geometric shape comprises projecting the locations of the boundary pixels on the plane defined by the coefficients.

14. The computer-readable storage medium of claim 13, wherein evaluating different points in the 3D point cloud comprises computer-readable program code to:
  identify multiple instances of the predefined geometric shape in the 3D point cloud;
  match the instances of the predefined geometric shape to model shapes in a design model of components within at least one viewing region of the first and second electromagnetic sensors; and
  select the identified geometric shape by identifying an instance of the predefined geometric shape that matches a model shape containing the feature.

15. The computer-readable storage medium of claim 13, wherein the first and second electromagnetic sensors are respective visible light cameras, the storage medium further comprising computer-readable program code to:
  activate a laser emitting a random dot pattern, wherein images captured by the visible light cameras include at least a portion of the random dot pattern.

16. The computer-readable storage medium of claim 15, wherein the boundary pixels are identified using a first image captured by one of the visible light cameras, wherein the first image is captured when the laser is deactivated.

17. The computer-readable storage medium of claim 13, wherein identifying the boundary pixels comprises computer-readable program code to:
  perform edge detection on an image, wherein the boundary pixels are located on a 2D image plane.

18. The computer-readable storage medium of claim 13, wherein generating the 3D point cloud comprises computer-readable program code to:
  generate a disparity map by comparing locations of objects in a first image captured by the first electromagnetic sensor to locations of the objects in a second image captured by the second electromagnetic sensor, the disparity map indicating distances between the objects and the first and second electromagnetic sensors; and generate the 3D point cloud based on the disparity map.

* * * * *